Dec. 8, 1925.

W. J. ANDREWS 1,564,399

PULLEY

Filed Nov. 27, 1923

Inventor
William J. Andrews,
By W.C. Schoenborn,
Attorney

Patented Dec. 8, 1925.

1,564,399

UNITED STATES PATENT OFFICE.

WILLIAM J. ANDREWS, OF EAST LYME, CONNECTICUT.

PULLEY.

Application filed November 27, 1923. Serial No. 677,264.

*To all whom it may concern:*

Be it known that I, WILLIAM J. ANDREWS, a citizen of the United States, residing at East Lyme, in the county of New London and State of Connecticut, have invented certain new and useful Improvements in Pulleys, of which the following is a specification.

This invention relates to pulleys, and more particularly to the class of fan belt drive pulleys used in connection with "Ford" automobiles, or belt driven rotary water or oil pumps to prevent the water or oil being deposited or thrown upon the driving belt in case of a leaky gland, stuffing box, or similar construction.

The objects of the invention are as follows:—

First, to provide a pulley of the class referred to which will be simple in character and lowest cost to manufacture, consist of a minimum number of parts, readily inspected, easily installed or repaired, and which requires no skilled labor or tedious adjustments to be kept in efficient and constant operation.

Second, to provide a pulley of the character above indicated which will prevent the oil escaping from the crank case around the crank shaft of an automobile, or oil or other fluid from a leaky gland or stuffing box from being deposited on and penetrating the driving belt operating a rotary pump, thereby either reducing the life of the belt or making said belt and machine inoperative for the purpose designed.

Third, to provide a pulley consisting of a single element which will when used in connection with the fan belt of a "Ford" automobile will enable said belt not only to efficiently and continuously operate independent of the leakage of the oil from the crank case, but at the same time under all conditions of service, prevent said fan belt coming in contact with and chafing the circuit wires leading from the ignition timer or short circuiting the ignition system of the engine.

Fourth, to provide a pulley having a permanent and integral element of novel construction, which is incapable of being disarranged, distorted or affected in any manner, thereby insuring its constant and efficient operation under all conditions of service, and which is adapted to collect or gather all the oil or other fluid injurious to or prevent the efficient operation of the driving belt, which may be deposited on said pulley, and permit said collected oil or fluid to be thrown from the pulley or face of the driving belt during the rotation of said pulley.

Fifth, to provide a lower driving pulley of such construction and cooperating key, which is capable of being quickly and accurately installed on the pulley, so that the rim or driving face and side belt retaining flanges will be directly and properly in line with the corresponding section of the face and flanges of an upper or driven pulley, thereby insuring the correct running of the cooperating belt and eliminating any unnecessary wear on the edges of said belt.

Sixth, to provide a pulley particularly adapted for use with an automobile engine which will insure the constant and efficient operation of the cooperating fan belt in order to guard against the overheating of the motor or breaking down of the cooling system.

Seventh, to provide a pulley for the purpose indicated which may be quickly and readily installed or substituted for any of the present types now in use without making any changes, modifications or adjustments of the existing cooperating parts.

Other objects and advantages of the invention will appear from the detailed construction and arrangement of the parts, manner of attaching the same and mode of operation to be hereinafter more fully described.

The invention consists of structural characteristics and relative arrangements of elements which will be presently more fully disclosed and particularly pointed out in the appended claims.

In the drawings, in which similar reference characters indicate the same parts in the several figures.

Figure 1:
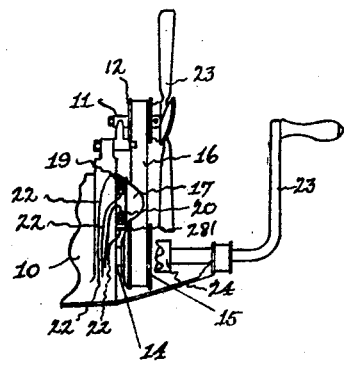
Figure 1 is a fragmentary view and side elevation of a "Ford" automobile engine showing where the improved pulley is attached.
Figure 2:
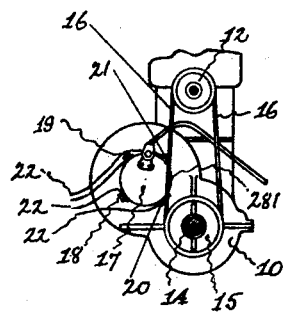
Figure 2 is a front elevation of the engine shown in Figure 1 with the fan and the starting crank removed.

Referring to Figures 1 and 2 of the drawings, 10 is the forward end of the crank case, 11 the adjustable bracket secured to said crank case and which rotatably supports the upper fan belt pulley 12 carrying and made integral with the fan 13 in the usual manner.

Figure 3:
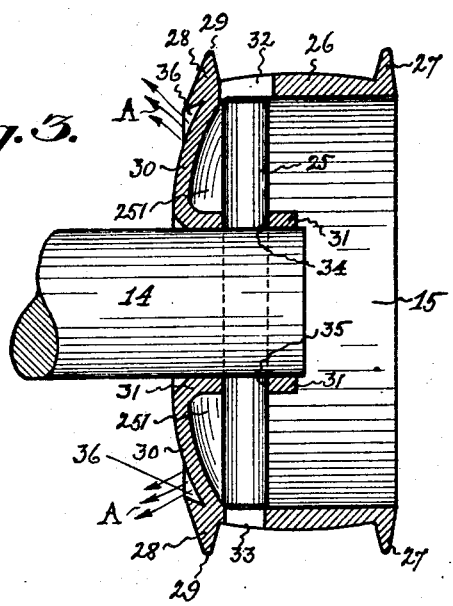
Figure 3 is an enlarged and central vertical section of the improved pulley mounted on an end or stub of a crank shaft.

14 is the stub of the crank shaft protruding from the crank case to which is suitably connected or keyed the novel lower or fan belt drive pulley 15, shown in Figure 3 and to be more particularly described hereafter in detail.

16 is the fan belt passing over the upper and lower pulleys 12 and 15 in the usual manner, as illustrated. 17 is the ignition timer provided with the usual four terminals or points 18, 19, 20 and 21, and from which the four independent wires or circuits 22, 22, lead to proper terminals or binding posts of the induction coil box, not shown, and fully understood and requiring no further disclosure.

23 is the starting crank having at its inner end the ratchet 24 so constructed and arranged to pass within the lower pulley 15 and engage a combined key and crank pin 25 passing through the outer end of the stub 14 of the crank shaft, as shown in Figure 3. The foregoing described relation of the different parts are all old and well known and form no part of the present invention.

The novel structural characteristics of the present invention are more clearly shown in Figure 3 and consist of a pulley 15 made of any suitable material and preferably die-cast of semi-steel and having a rim 26 with peripheral flanges 27, 28, of inverted V-shape in cross section and having outwardly flaring inner sides, and the pointed edge 29 of the flange 28 is so located and arranged at the outer extremity of the curved web or back 30 connecting the rim 26 and the hub 31 of the pulley 15 so as to provide a clearance 281 between the inner edge of said pulley 15 and the timer 17, see Figures 1 and 2, thereby insuring that the fan belt 16 be kept from contact at all times from the wires 22, 22 connected to the terminal points 20 and 21 of the timer 17 and eliminating all possibility of any chafing of the wires 22, 22 and short circuit between said wires and belt. The curved web or outwardly bowed back 30 of the pulley 15 not only advantageously performs the above indicated functions of the fan belt with respect to wires 22, 22, but at the same time forms the required clearance or necessary space 251 within and between web 30 and hub 31 of the pulley 15 and inner side or back of the crank pin 25 for the proper insertion and positive engagement of the ratchet 24 on the starting crank 23 around said pin 25 during the manual rotation of the crank shaft stub 14 or starting of the engine.

The rim 26 is provided with alined large and small openings 32 and 33 for the insertion and removal of the combined key and crank pin 25 through alined openings 34 and 35 in the hub 31 and stub 14, and said openings 32 and 33 are so disposed and preferably adjacent to the flange 28 as to place the center of face of rim 26 of the lower pulley 15 alined with the center of face of rim of the upper or driven pulley 12 attached to fan 13, thereby preventing any unnecessary wear on edges of fan belt 16 as will be readily understood.

While the foregoing described constructions of the lower pulley 15 are highly important for an efficient operation of the same, the most essential structural feature is the annular groove 36 formed preferably V-shaped in section on the outer face of the curved web or back 30 of the pulley 15 and preferably at a point near the outer face of the side flange 28 adjacent to the crank case 10. Said groove 36 is so designed, proportioned and disposed as to collect all oil which slowly passes from within the crank case by leakage around the forward end or stub 14 of the crank shaft, and thereby gathering and spreading on the outer and adjacent face of the curved web or back 30 of said pulley 15, and said leakage or stray oil, during the rapid rotation of the pulley 15, is constantly forced by centrifugal action radially on said web or back 30 and creeps towards and into the annular groove or oil depository 36, and finally thrown out of said groove 36 and from the pulley 15 in the direction as indicated by the arrows A, thus preventing any oil collected or splashed on said pulley 15 from being deposited on the edges or surfaces of the fan belt 16, thereby insuring not only long life to the leather or composition belting but also permitting the use of a belt much looser than heretofore and with better results for the reason that a tight belt is soon worn out and is short lived and requires more power to drive the same.

From the foregoing description of the construction and arrangement of the pulley, it will be seen that all the advantages and objects of the invention have been fully and efficiently carried out, and while I have shown and described the preferred form of my invention, it will be manifest that many changes will readily suggest themselves without in any way departing from the spirit of the invention or scope of the claims, and while the oil gathering groove is V-shaped in section and near the outer edge or periphery of the pulley, it may be of any other form, cross section, or configuration and at any other position between the hub and rim of the pulley and used in connection with a straight back or web if found desirable instead of an outwardly bowed back or web 30 as illustrated in Figure 3.

What I claim is:

1. A combined cranking and belt pulley comprising a hub, an annular rim having peripheral flanges, and a web or imperforate back connecting said hub and rim, said web or back having an annular fluid collecting recess or pocket on its outer side between the hub and rim, said recess being adjacent to the flange and outwardly flaring and so constructed, arranged and adapted to intercept and collect a fluid creeping up on the outer side of said web or back from the hub towards the rim and throw said collected fluid from the pulley during the rotation of said pulley.

2. A combined cranking and belt pulley comprising a hub, and annular rim having peripheral flanges, and an outwardly curved web or back connecting said hub and rim, said web or back having an annular outwardly flaring groove on its outer side between the hub and rim, said groove being adjacent to the flange and so constructed, arranged and adapted to intercept and collect a fluid creeping up on the outer side of said web or back from the hub towards the rim and throw said collected fluid free of the pulley during the rotation of said pulley.

3. A combind cranking and belt pulley comprising a hub, an annular rim, and an outwardly curved web or back connecting said hub and rim, said web or back having an outwardly flaring annular groove on its outer side between the hub and rim and adjacent to said rim, said groove having an outwardly and downwardly inclined upper surface so constructed, arranged and adapted to intercept and collect a fluid creeping up on the outer side of said web or back from the hub towards the rim and later throw said fluid free of and during rotation of said pulley.

4. A combined cranking and belt pulley comprising a hub having diametrically alined openings, an annular rim having a flange at one of its edges and alined openings near said flange and in alinement with said openings in said hub, and an outwardly curved web or back at one end of the pulley and having an outwardly flaring annular fluid intercepting and collecting recess on its outer side between the hub and rim and adjacent to the rim for throwing said intercepted fluid creeping up the outer side of the web from the pulley, said curved web connecting said rim with the hub at the flange adjacent to the alined openings in the rim.

In testimony whereof, I affix my signature.

WILLIAM J. ANDREWS.